Figure 1:
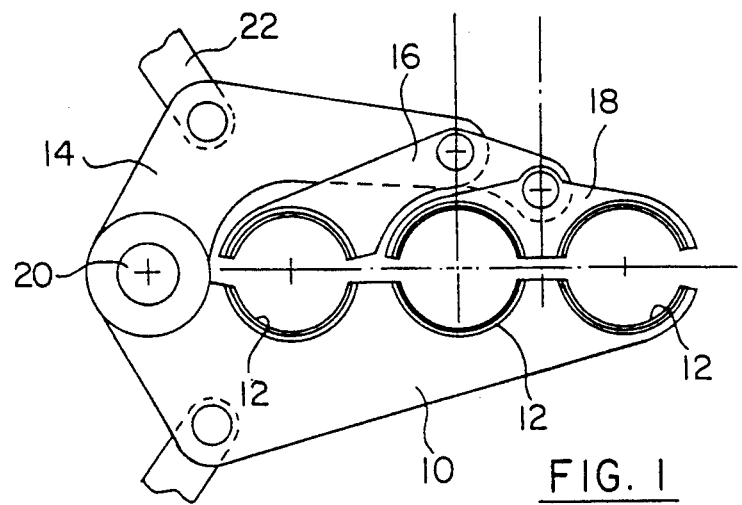

United States Patent [19]

Voisine et al.

[11] Patent Number: 5,019,147
[45] Date of Patent: May 28, 1991

[54] MOLD ARM CLOSING MECHANISM FOR AN INDIVIDUAL SECTION MACHINE

[75] Inventors: Gary R. Voisine, E. Hartford; Kenneth L. Bratton, Enfield, both of Conn.

[73] Assignee: Emhart Industries, Inc., Towson, Md.

[21] Appl. No.: 591,427

[22] Filed: Oct. 1, 1990

[51] Int. Cl.⁵ .............................................. C03B 9/40
[52] U.S. Cl. ...................................... 65/360; 65/357; 65/361
[58] Field of Search .................. 65/240, 241, 260, 307, 65/357, 360, 361

[56] References Cited

U.S. PATENT DOCUMENTS

| | | | |
|---|---|---|---|
| 3,798,019 | 3/1974 | Bystrianyk et al. | 65/360 |
| 4,375,979 | 3/1983 | Newkirk et al. | 65/360 |
| 4,486,215 | 12/1984 | Irwin et al. | 65/360 |
| 4,655,813 | 4/1987 | Nebelung | 65/357 X |

Primary Examiner—Robert L. Lindsay
Attorney, Agent, or Firm—Spencer T. Smith

[57] ABSTRACT

A pivotally mounted mold support has a cylindrical roller extending parallel to the pivot shaft. A pivotal lever arm is connected to the mold support via a link which is connected to the pin supporting the cylindrical roller. The lever arm has a cam surface which engages the roller to close the mold support and establish a line of force extending between the axis of the roller and the axis of the pivot shaft.

1 Claim, 5 Drawing Sheets

MOLD ARM CLOSING MECHANISM FOR AN INDIVIDUAL SECTION MACHINE

The present invention relates to glass forming machines generally referred to as individual section machines and more specifically to the mechanism for closing opposed mold arms in such machines.

Glass bottles are conventionally made in an individual section machine which is made up of a number of individual sections each having a blank side and a blow side. Opposed mold halves are supported on pivotally closeable mold arms which are closed during the formation of the parison in the blank mold or the formation of the bottle in the blow mold.

During these processes large forces are generated which tend to open the molds spreading these arms apart. Conventionally, this is inhibited by increasing the mold closing forces and this requires stronger and stronger parts capable of responding to these increased forces.

It is accordingly an object of the present invention to provide a very simple mechanism for inhibiting the opening of the closed mold arms during parison or bottle formation.

Other objects and advantages of the present invention will become apparent from the following portion of the specification and from the accompanying drawings, which illustrate, in accordance with the mandate of the patent statutes, a presently preferred embodiment of the invention.

REFERRING TO THE DRAWINGS

Figure 2C:
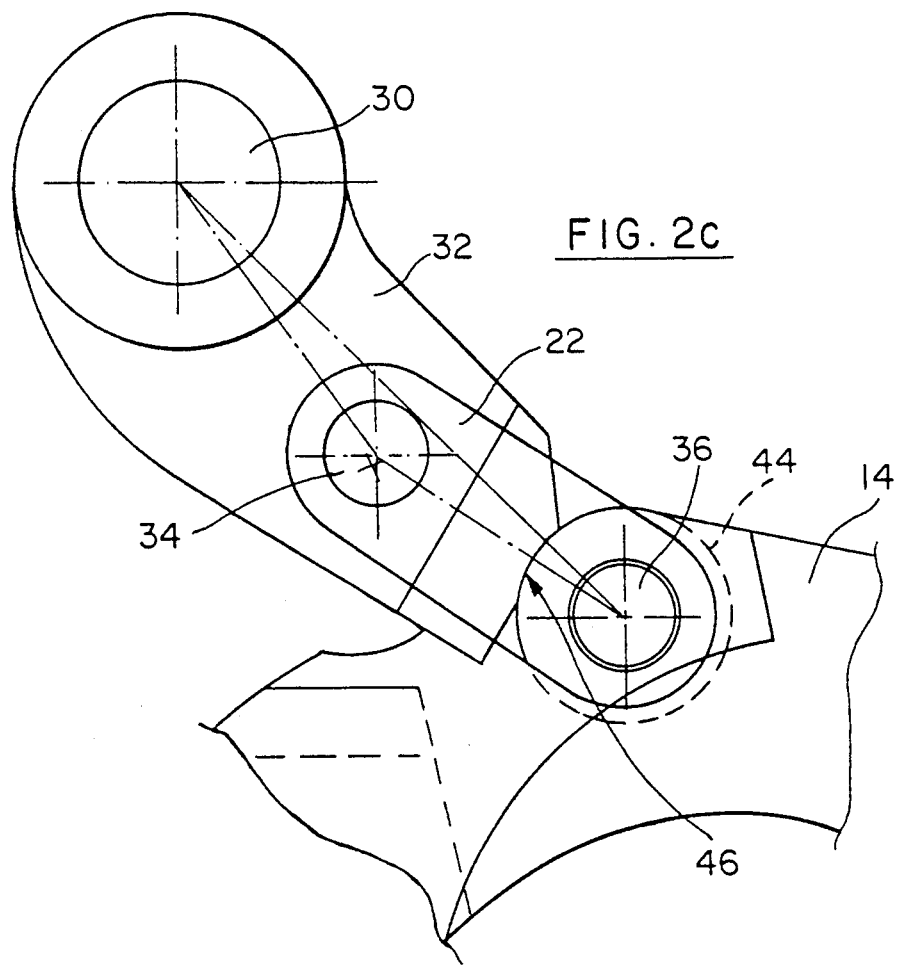
Figure 2A:
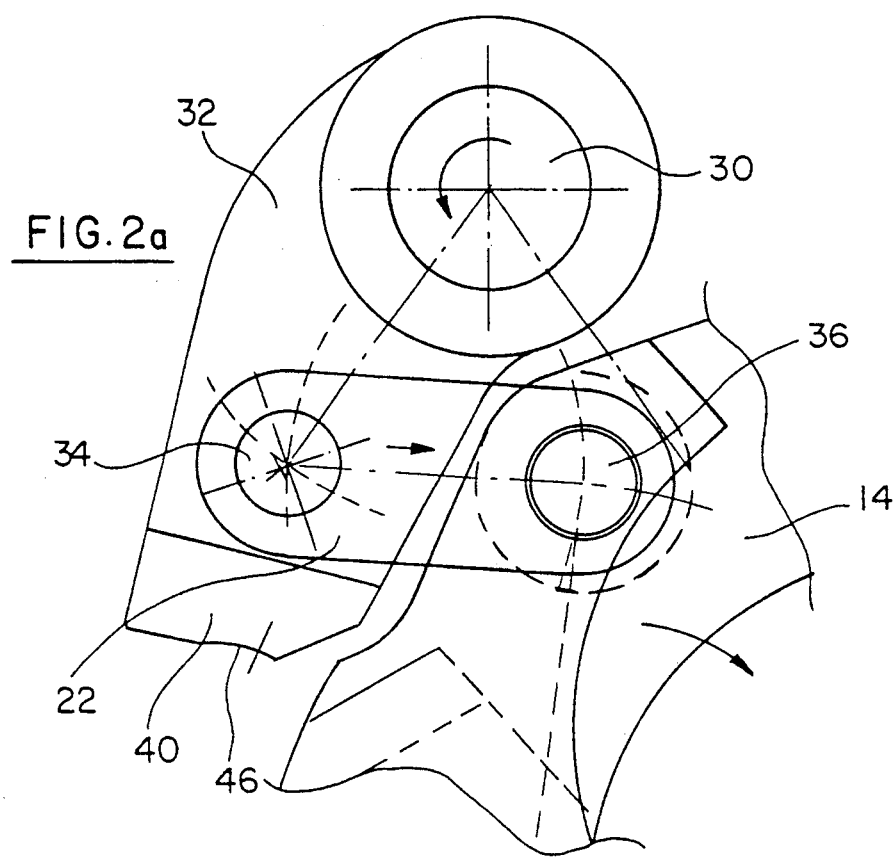
Figure 2B:
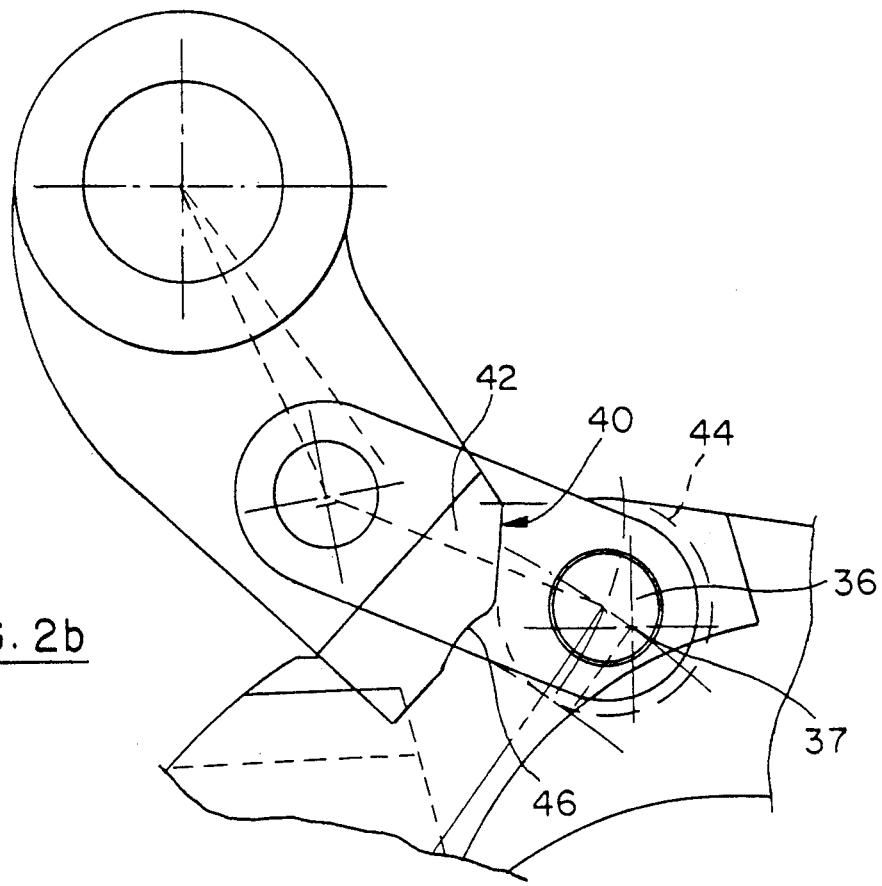
Figure 3:
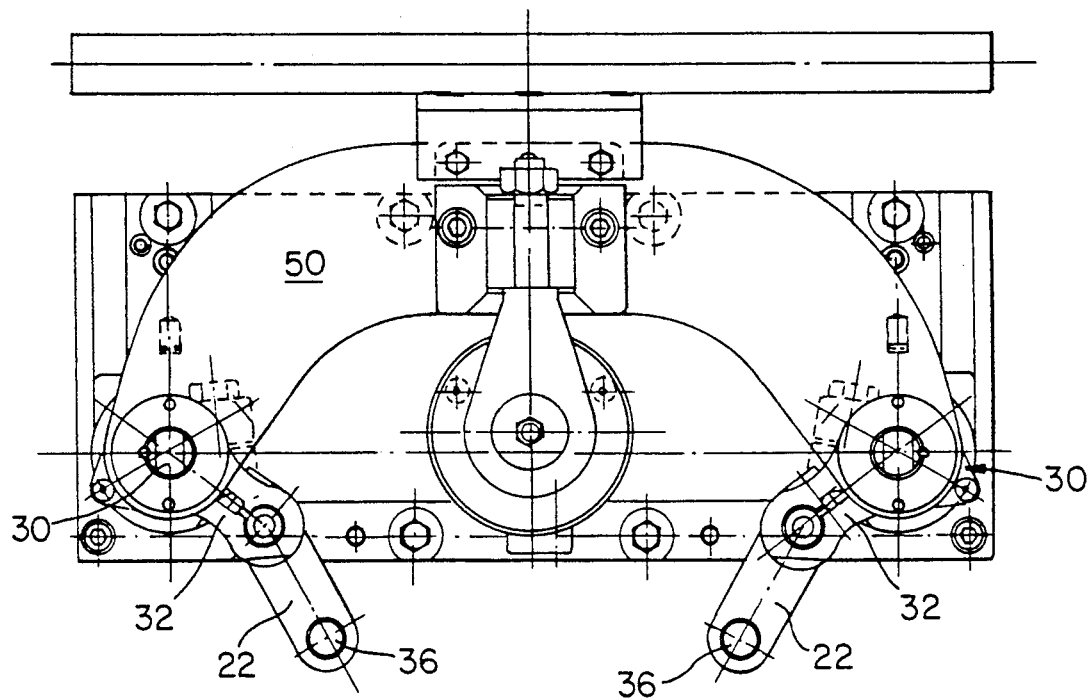
Figure 4A:
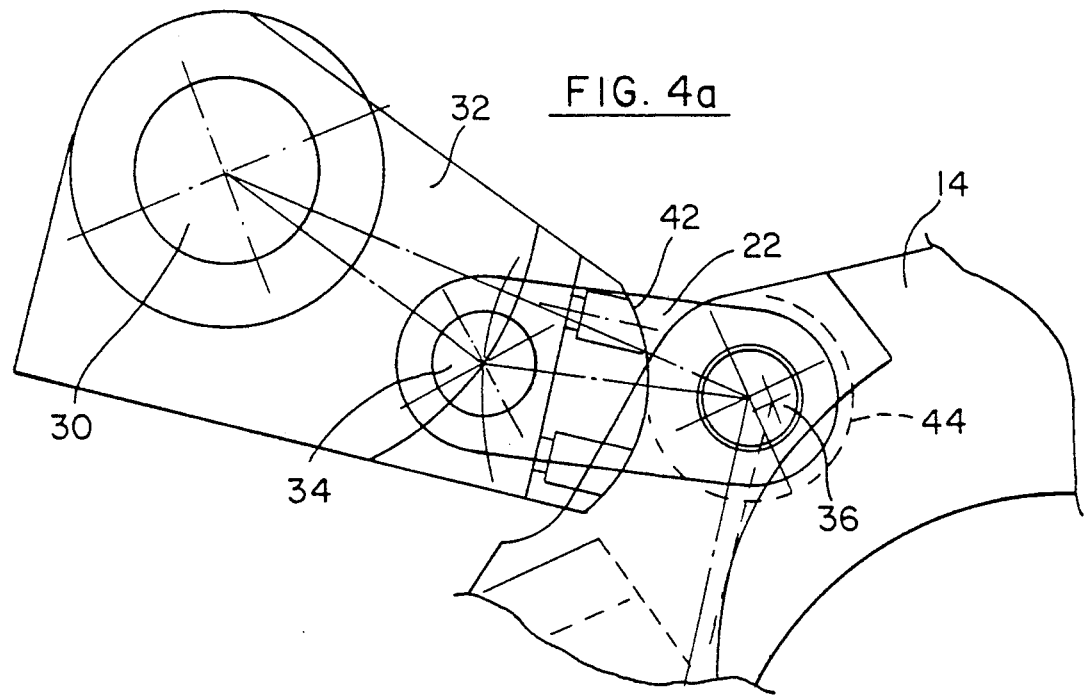
Figure 4B:
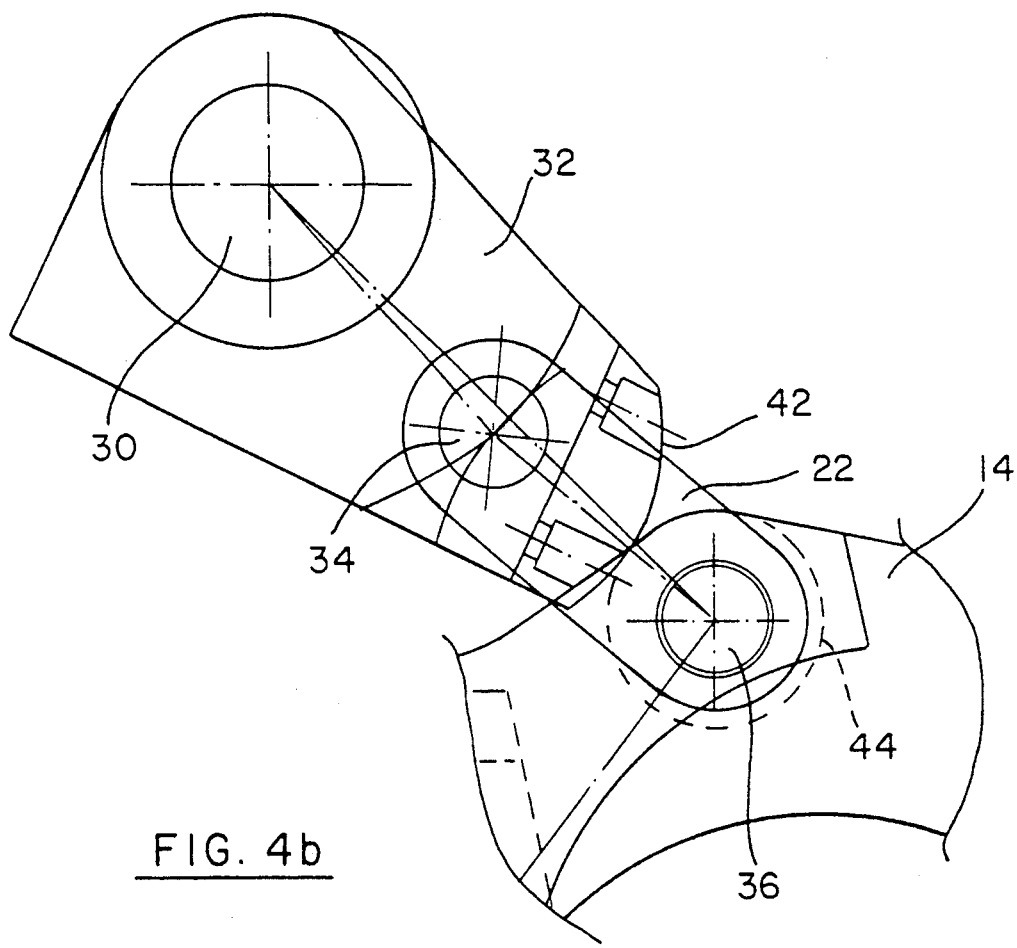
Figure 4C:
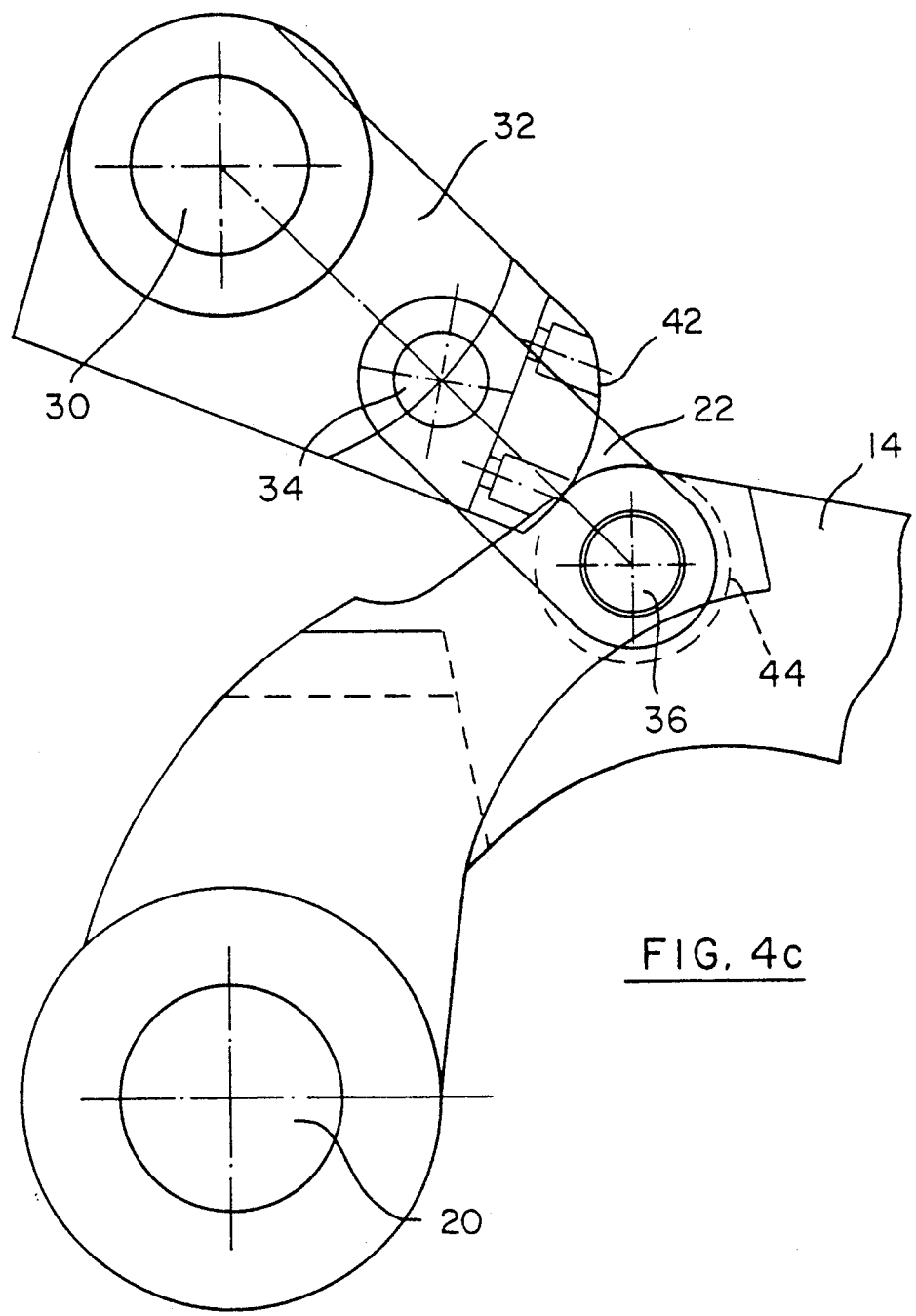

FIG. 1 is a top view of one of the opposed pair of mold closing arms made in accordance with the teachings of the present invention;

FIGS. 2A, 2B, and 2C are views similar to FIG. 1 showing a portion of the mold closing arm as it is displaced to a fully closed position;

FIG. 3 is a top view showing the support structure for the drive shaft for these mechanisms; and FIGS. 4A, 4B, and 4C are views similar to FIGS. 2A, 2B and 2C showing the same portion of the mold closing arm having a modified cam as it is displaced through its last portion of displacement to a fully closed position; and The mold holding apparatus includes a lower mold support 10 for receiving three mold halves 12, an upper support arm 14, which pivotally supports a first mold support 16, receiving the inner most mold half and a second mold support 18, which receives the two outermost mold halves and which is pivotally supported on the free end of the first mold support 16. The lower mold support 10 and the upper mold support 14 are pivotally secured to a post 20. A link 22 controls the pivotal displacement of each mold support.

Referring to FIG. 2A, counterclockwise rotation of a drive shaft 30 conjointly rotates an integral lever arm 32. This forces the link 22 which is secured to a lever pin 34 at one end and which is associated with a mold support pin 36 at the other end to move horizontally to the right, thereby rotating the mold support about shaft 20 to close the molds.

When the lever arm 32 rotates to the position shown in FIG. 2B, the surface 40 of a cam 42 which is secured to the lever arm 32 engages a roller follower 44 which is rotatably supported on the mold support pin 36. Continued closing movement causes the roller follower to ride along the cam surface 42 until the follower settles into a cylindrical portion 46 of the cam surface 42 (FIG. 2C). At this "mold closed" position, which corresponds to the mold closing assembly shown in FIG. 1, the line of force from the roller follower 44 to the cam 42 intersects the axis of the drive shaft 30. This is achieved by mechanically separating mold support pin 36 and the connecting link 22 at this time. As can be seen from FIG. 2B, mold support pin 36 is smaller than the associated link hole 37 and the axis of both the support pin 36 and link hole 37 are designed to be the same distance from the axis of lever pin 34 when the molds are closed. This prevents any force from being transmitted from the support pin 36 to the link 22. At this position the cam will resist opening movement so that line air used to displace the linkage to this closed position can be turned off. This will permit quicker application of line pressure, at the conclusion of bottle or parison formation to open the linkage. When the mold supports are displaced to the open position, the right hand end of this link hole 37 engages the support pin 36 to pull the mold support open. The left hand end of the link hole engages the support pin 36 to push the mold support to the closed position.

Since there is in effect, a continuous metal block behind the mold support, any movement of the mold support pin will result only from the deflection of the drive shaft and this will be minimized by supporting the drive shafts, in the region of the lever arm with an anti-deflection bracket 50 (FIG. 4).

An alternate cam design is illustrated in FIGS. 4A, 4B and 4C. In this design the axis of the drive shaft 30, lever pin 34, and mold support pin 37, are all in the same plane at the fully closed position with the line of force from the roller follower 44 to the cam 42 also intersecting the axis of the drive shaft 30. In this design however, the mold support pin 36 is forced by the increasing radius of the cam surface, against a side of the enlarged hole to prevent further rotative displacement of the lever arm.

We claim:

1. A mold closing mechanism for an individual section machine comprising
   a mold support pivotally mounted on a pivot shaft and including a cylindrical pin extending parallel to said shaft
   a driving post including an integral lever arm having a cylindrical pin extending in a direction parallel to the axis of said shaft,
   a link interconnecting said cylindrical pin on said lever arm and said cylindrical pin on said mold support, the hole in said link around said mold support pin being selectively larger than said cylindrical pin,
   said lever arm having a cam surface on the free end thereof, and
   a cylindrical follower matingly received on said mold support pin,
   said cam surface being selectively configured so that as said lever arm is rotated from a retracted position to an advanced position said cam surface will engage said cylindrical follower and forcefully pivot said mold support to said advanced position whereat the line of force between said mold support and said lever arm will lie on a line extending between the axis of said driving post and the axis of said mold support pin.

* * * * *